United States Patent [19]

Robillard

[11] Patent Number: 4,705,046

[45] Date of Patent: Nov. 10, 1987

[54] DEVICE FOR THE QUALITATIVE MEASUREMENT OF UV RADIATION RECEIVED BY THE SKIN

[76] Inventor: Jean J. A. Robillard, 28 Beechwood Road, Castletroy, Limerick, Ireland

[21] Appl. No.: 819,427

[22] Filed: Jan. 16, 1986

[51] Int. Cl.$^4$ ............................................. A61B 6/00
[52] U.S. Cl. .................................. 128/665; 252/586; 252/588; 422/57
[58] Field of Search ................ 128/665; 252/586, 588; 422/55, 57; 106/DIG. 6

[56] References Cited

U.S. PATENT DOCUMENTS

| | | | |
|---|---|---|---|
| 3,551,344 | 12/1970 | Gardlund et al. | 252/586 |
| 3,563,750 | 2/1971 | Walker et al. | 252/586 X |
| 3,609,093 | 2/1971 | Harrah | 252/586 |
| 3,973,966 | 8/1976 | Flannery et al. | 252/586 X |
| 4,342,668 | 8/1982 | Hovey et al. | 252/586 |
| 4,466,941 | 8/1984 | Cerami et al. | 422/57 |
| 4,637,698 | 1/1987 | Kwak et al. | 252/586 X |

OTHER PUBLICATIONS

Merle, J., "A Photochromic Film and Process for Forming the Same", Inttel Appl. publication No. WO85/00432, Jan. 1985.

Primary Examiner—Kyle L. Howell
Assistant Examiner—Francis J. Jawaislin
Attorney, Agent, or Firm—Birch, Stewart, Kolasch & Birch

[57] ABSTRACT

A device for the qualitative measurement of uv radiation received by the skin consists of a laminar strip for application to the skin, the strip including a photochromic material disposed intermediate the ends of the strip and a reference material also disposed intermediate the ends of the strip. The reference material is suitably a dye which matches closely the color of the photochromic material after exposure to a pre-determined quantity of uv radiation. The predetermined quantity of uv radiation corresponds to the maximum exposure tolerable by the particular skin type. The device enables one to visually assess exposure to uv radiation by a direct comparison of the color densities of the photochromic material and the reference material during exposure to sunlight.

21 Claims, 4 Drawing Figures

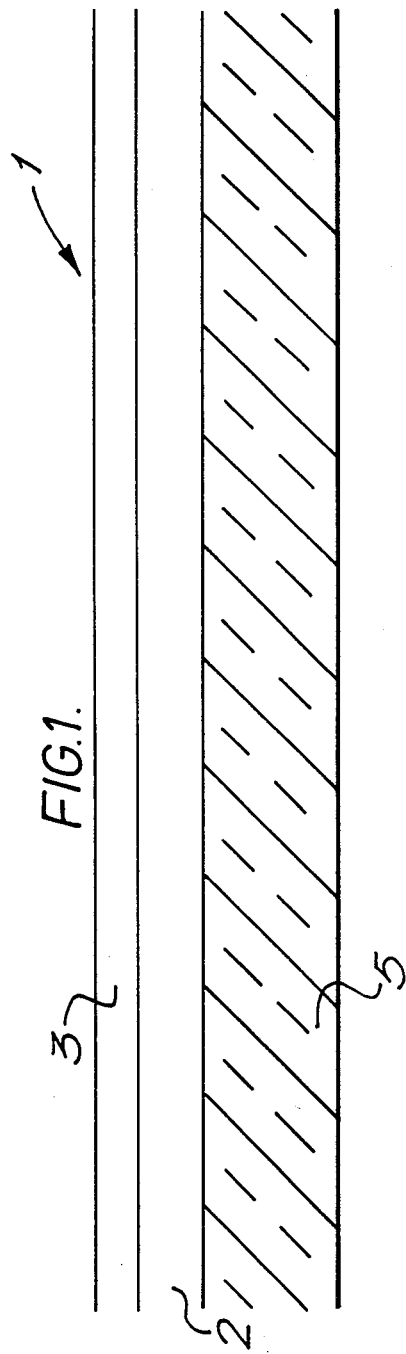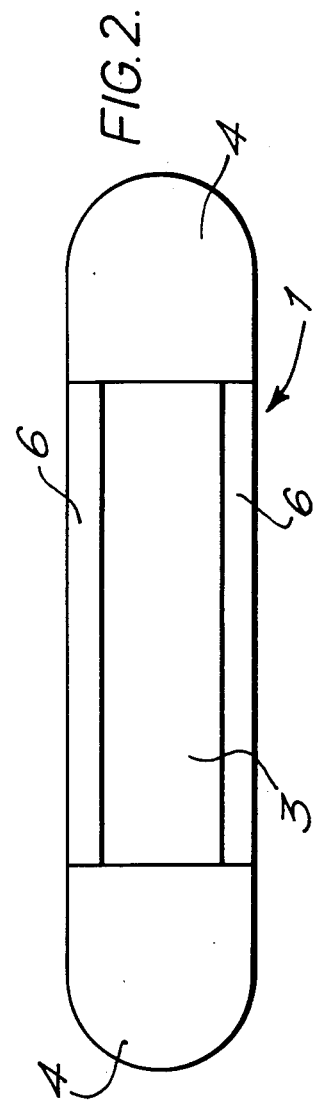

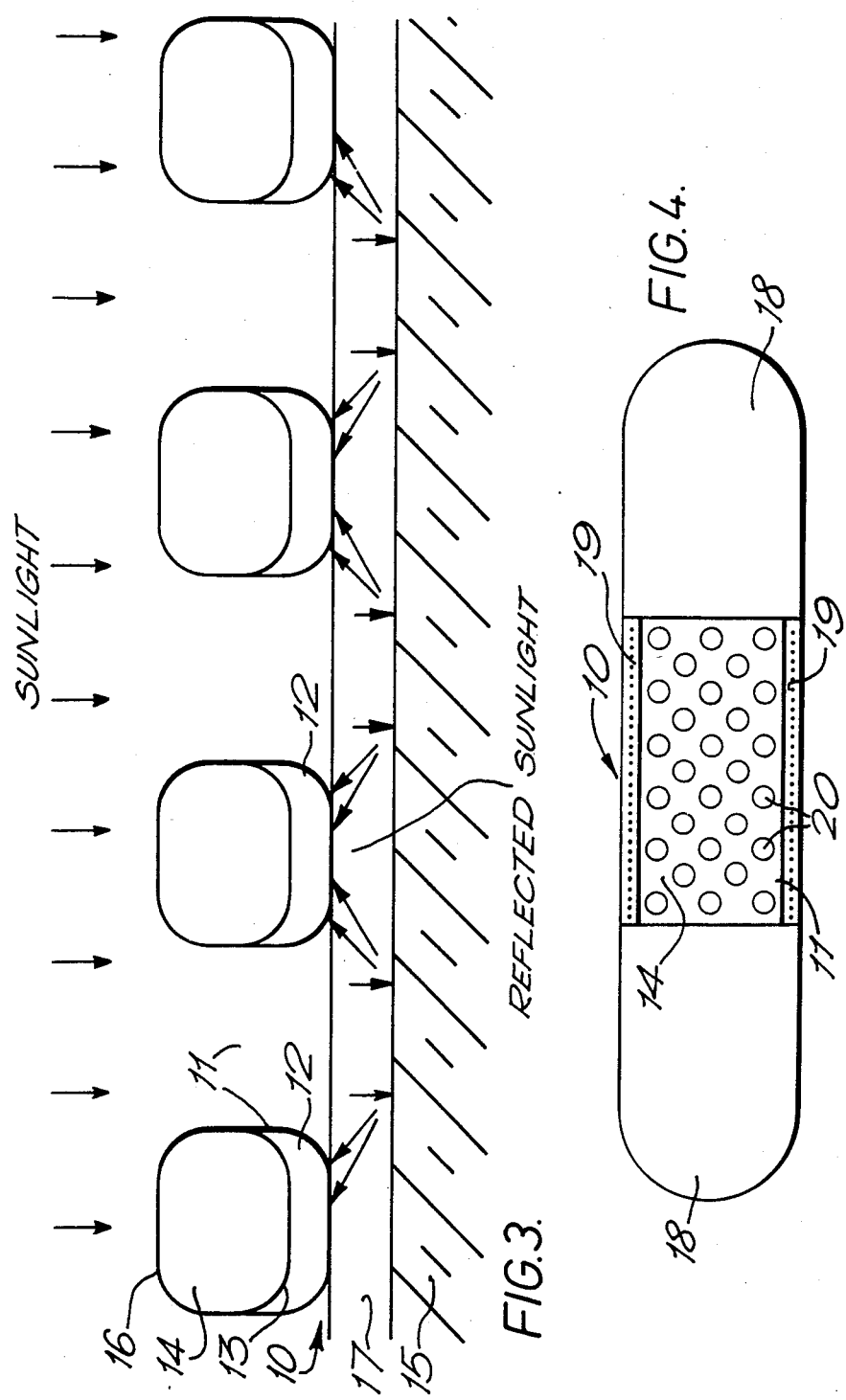

DEVICE FOR THE QUALITATIVE MEASUREMENT OF UV RADIATION RECEIVED BY THE SKIN

BACKGROUND OF THE INVENTION

FIELD OF THE INVENTION

This invention relates to a device for the qualitative measurement of the dose of uv radiation received by the skin and the application of said device in preventing erythema or other damage to skin caused by over exposure to uv radiation.

Over exposure to uv radiation can result in damage to the skin which varies in severity from slight reddening and accompanying soreness to severe burning. Furthermore, over exposure to uv radiation, especially the shorter wavelengths thereof, has been indicated in the development of skin cancers, especially melanoma.

Sun-screen preparations for different skin types are available. However, it is difficult to predict a person's skin type accurately and, therefore, such preparations are only of limited use in preventing over exposure to uv radiation. In general, the sensitivity of skin to uv radiation varies inversely with the degree of pigmentation.

Accordingly, there is a need of means for indicating when the skin has been exposed to sufficient uv radiation so as to prevent over exposure and consequent skin damage.

It is an object of the present invention to provide a device and a method for preventing over exposure to uv radiation.

SUMMARY OF THE INVENTION

A device for the qualitative measurement of uv radiation received by the skin, said device comprising a laminar strip for application to the skin, the strip including:

(a) a photochromic material disposed intermediate the ends of the strip; and (b) a reference material disposed intermediate the ends of the strip; said reference material being so arranged relative to the photochromic material so as to permit a visual assessment of exposure to uv radiation, based, at least partially, on uv radiation reflected from the skin, by a direct comparison of the colour densities of the photochromic material and the reference material during exposure to sunlight.

DETAILED DESCRIPTION OF THE INVENTION

The reference material of the device is preferably a dye. The dye for use as the reference material must match closely the colour of the photochromic material after exposure to a pre-determined quantity of uv radiation, said pre-determined quantity of uv radiation corresponding to the maximum exposure tolerable by the particular skin type.

Preferably, the photochromic material and the reference material are each finely dispersed in an organic binder. Most preferably, the photochromic material and the reference material represent a solid emulsion or a solid solution in the organic binder. The organic binder should be hydrophobic and non-degradable upon exposure to uv radiation. Preferred organic binders that meet these criteria are butadiene and styrene polymers and butadiene-styrene copolymers.

In a preferred embodiment a layer of reference material will be positioned on either side of the photochromic material.

The photochromic material is preferably coated on a layer of transparent material.

Preferred transparent materials are cellulose triacetate, a cellulose polyester or polyethylene terephthalate. Further, preferably the layer of transparent material will be between 60 and 200 microns in thickness.

Preferably the device will be provided with adhesive means for adhesion to the skin.

In one preferred embodiment the photochromic material is dispersed in a layer of an organic binder and coated on a thin transparent substrate which is an integral part of an adhesive tape for adhesion to the skin, the sides of the transparent substrate being coated with a layer of a dye dispersed in an organic binder. The density of colouration of the dye layer is adjusted so that it corresponds to the density of colouration of the photochromic layer after exposure to a dose of uv radiation corresponding to the dose tolerated by the skin. In this embodiment uv rays reflected from the skin are only partially responsible for the change in colour of the photochromic layer as hereinafter described.

In an alternative preferred embodiment the photochromic material is coated on the solid parts of a transparent mesh which is composed of a material which is uv absorbent, the mesh being coated on its surface which in use is nearest the skin with said photochromic material, such that uv radiation impinging on the photochromic material is totally reflected from the skin.

Suitable uv absorbent materials are: benzotriazol, UVINUL (UVINUL is a Trade Mark of Gaf Inc.), UVISTAT (UVISTAT is a Trade Mark of American-Cyanamid), TINUVIN (TINUVIN is a Trade Mark of Ciba-Geigy AG) or 2,4-dibenzoyl resorcinol.

Suitable photochromic materials for use in the device according to the invention belong to the different groups of families classified as spiropyrans and related compounds as described in Brown's: Photochromism (Interscience).

A preferred class of photochromic materials for use in the device according to the invention are the spiropyrans of the general formula I:

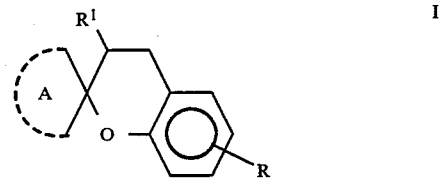

in which A represents: a group of the formula,

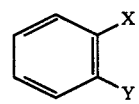

wherein X is selected from the group consisting of

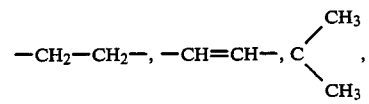

O, S, Se and NH and Y is selected from the group consisting of O, S and N(R) where R is as hereinafter defined, the ring containing X and Y optionally containing a further double bond; or a group of the formula

wherein X is S and Y is selected from the group consisting of: O and S, R represents one or more groups selected from the group consisting of: hydrogen, $C_{1-8}$-alkyl, halogeno $C_{1-6}$ alkyl, $C_{1-6}$alkoxy, halogen, nitro, hydroxy, aryloxy, unsubstituted phenyl or phenyl substituted by one or more R groups, a piperidyl radical, an alkylene ester group, an alkylene carboxyl group and a substituted or unsubstituted carbonamide group and $R^1$ represents hydrogen or an aliphatic or aromatic hydrocarbon group.

An especially preferred class of photochromic materials for use in the device according to the invention are spiro-pyrans of the formula II:

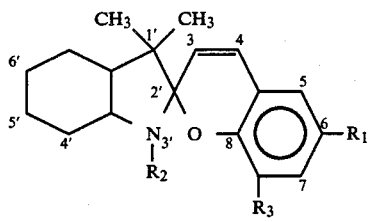

wherein $R_1$, $R_2$ and $R_3$ are identical or different and each has the values specified for R above.

A preferred spiropyran of the formula II is one wherein $R_1$ is nitro, $R_2$ is isopropyl and $R_3$ is methoxy.

Other preferred spiropyrans are selected from the group consisting of:

1,3 dimethyl-3-isopropyl-6-nitrospiro (2'H-1'-benzopyran-2,2'-indoline);

5-bromo-3',3'-diethyl-8-methoxy-1'-methyl-6-nitrospiro (2'H-1'-benzopyran-2,2'-indoline);

1'-isopentyl-3',3-dimethyl-6-nitrospiro (2'H-1'-benzopyran-2'-indoline);

7-nitro-5,6,8-trichloro-1',3',3'trimethylspiro (2H-1-benzopyran-2,2'-indoline);

1-3',3',8-tetramethylspiro (2H-1-benzopyran-2,2'-indoline);

4',6',8-trimethoxy-1',3',3'-trimethylspiro (2H-1-benzopyran-2,2'-indoline);

4',7',8-trimethoxy-1',3',3'-trimethylspiro (2H-1-benzopyran-2,2'-indoline);

5',7',8-trimethoxy-1',3',3'-trimethylspiro (2H-1-benzopyran-2,2'-indoline);

3,3'-dimethyl-6,6'-dinitrospiro (2H-1-benzopyran-2,2' benzothiazoline);

3,3'-dimethyl-8-methoxy-6-nitro-5' phenylspiro (2H-1-benzopyran-2,2'-benzoxazoline);

6-chloro-6'-nitro-3-phenyl-2,2'-spirobi (2H-1-benzopyran);

8-methoxy-8'-nitro-3-phenylspirobi (2H-1-benzopyran);

6,8 diiodo-1',3',3'-trimethylspiro (2H-1-benzopyran-2,2'-indoline);

6-hydroxy-8-methoxy-1',3',3'-trimethylspiro (2H-1-benzopyran-2,2'-indoline);

6',8-dimethoxy-3,3'-dimethyl-6-nitrospiro (2H-1-benzopyran-2,2'-benzothiazoline);

3,3'-dimethyl-6,6'-dinitrospiro (2H-1-benzopyran-2,2' benzothiazoline);

3,3'-dimethyl-8-methoxy-6-nitrospiro (2H-1-benzopyran-2'2 benzothiazoline);

3-ethyl-8-methoxy-3'-methyl-6-nitrospiro (2H-1-benzopyran-2'2 benzothiazoline);

3'-ethyl-8-methoxy-3-methyl-6-nitrospiro (2H-1-benzopyran-2,2'-benzothiazoline);

5-bromo-8,8'-dimethoxy-6-nitro-3' phenylspirobi (2H-1-benzopyran);

6-hydroxy-1',3',3'-trimethylspiro (2H-1-benzopyran-2,2'-indoline);

6-phenylazo-1',3',3'-trimethylspiro (2H-1-benzopyran-2,2'-indoline);

6'-acetamido-3,3'-dimethyl-6-nitrospiro (2H-1-benzopyran-2,2'-benzothiazoline);

6'-amino-3,3'-dimethyl-6-nitrospiro (2H-1-benzopyran-2,2' benzothiazoline);

8-bromo-3,3'-dimethyl-6-nitrospiro (2H-1-benzopyran-2,2'-benzothiazoline);

6-chloro-3,3'-dimethyl-8-nitrospiro (2H-1-benzopyran-2,2'-benzothiazoline); and 8-methoxy-3'-methyl-6-nitro-3-propylspiro (2H-1-benzo-pyran-2,2'-benzothiazoline).

Dyes for the reference material should be longlasting and should not degrade appreciably during exposure to uv radiation. Essentially the only restriction for the dyes is their colour. When a spiropyran is used as the photochromic material, the dye should match the open form of the spiropyran. They should also desirably be suitable for incorporation in a binder to form a thin layer.

Suitable dyes include azo dyes, anthraquinone dyes, Indigoids, oxazine dyes, methine dyes, xanthene dyes and triarylmethane dyes.

Especially suitable dyes are given in Table I.

TABLE 1

| REFERENCE LAYER DYE (Class) | COMMERCIAL NAME | SOURCE |
|---|---|---|
| Diazo | Rapidogen Blue B | I.G. Farben |
| Polymethine | Astrazon Blue BG | Bayer AG |
| Anthraquinone | Alizanthrene Navy Blue | Clayton Aniline Co. |
| Anthraquinone | Carbolan Blue B | I.C.I. |
| Triarylmethane | Victoria Blue | I.C.I. |
| Oxazine | Chromazol Blue 5G | I.C.I. |
| Azine | Comassie Blue | I.C.I. |
| Triarylmethane | Victoria Blue | I.C.I. |
| Polymethine | Astrazon Blue B.6 | Bayer AG |
| Xanthene | Eosine | I.G. Farben |
| Xanthene | Solochrome | I.C.I. |
| Thiazine | Cibachron Scarlet | CIBA |
| Anthraquinone | Indanthrene Red FBB | BASF |
| Diazo | Rapidogen Red R | I.G. Farben |
| Polymethine | Astrazon Red 6B | Bayer AG |
| Anthraquinone | Alizarine Rubinol R | Bayer AG |
| Xanthene | Solochrome | I.C.I. |
| Anthraquinone | Flavanthrone | I.G. Farben |
| Thiazole | Thioflavine S | Cassela |
| Azomethine | Zapon Fast Yellow G | BASF |
| Thiazol | Acronol Yellow T | I.C.I. |
| Diazo | Rapidogen Yellow G | I.G. Farben |
| Polymethine | Astrazone Yellow | Bayer AG |
| Carboxylic | Indanthrene Yellow 56 K | Bayer AG |
| | Gallein | Bayer AG |
| | Erythrosin B | Bayer AG or BASF |
| | Indigo | I.C.I. or BASF. |

The invention also provides a method of qualitatively measuring uv radiation received by the skin, which comprises applying a device as hereinabove defined to an area of the skin exposed to sunlight and assessing the dose of radiation received at selected intervals of time by a direct visual comparison of the colour densities of the photochromic material and reference material, respectively.

DETAILED DESCRIPTION OF THE DRAWINGS

The invention will be understood from the following description of embodiments thereof given by way of example only with reference to the accompanying drawings in which:

FIG. 1 is a front sectional elevation of a device according to the invention;

FIG. 2 is a plan view of the device shown in FIG. 1;

FIG. 3 is a front sectional elevation of a further device according to the invention; and FIG. 4 is a plan view of the device shown in FIG. 3.

Referring to FIGS. 1 and 2 of the drawings, there is illustrated a device for the qualitative measurement of uv radiation received by the skin. The device comprises a laminar arrangement 1 consisting of a transparent support 2 of cellulose triacetate and a layer 3 of a photochromic material coated on the transparent support 2. The support 2 is provided at each end with an adhesive strip 4 for adhesion to the skin 5. The layer 3 of photochromic material is formed by dispersing the photochromic material in an organic binder and coating the transparent support 2 with the mixture. The support 2 is provided on each longitudinal side bordering the layer 3 of photochromic material with a layer 6 consisting of a dye dispersed in an organic binder. The colour of the layer 6 is such that it corresponds to the density of colouration of the layer 3 of photochromic material after exposure to a dose of uv radiation corresponding to the dose tolerated by the skin 5.

It has been found that the amount of uv light reflected by the skin of a person exposed to sunlight is inversely proportional to the degree of acceptance of said skin to the uv radiation before causing erythema.

The density of colour produced in the layer 3 of photochromic material is a function of the amount of uv radiation absorbed by said layer. The uv light falling on the laminar arrangement 1 is partly absorbed by the layer 3 of photochromic material, it is then reflected by the skin 5 and absorbed again by the layer 3. The total amount of uv energy W absorbed by the layer 3 is the sum of the energies absorbed during the transmission of light through the layer 3 before and after reflection on the skin 5.

The energy reflected by the skin 5 is a function of certain skin parameters such as pigmentation or previous exposure to the sun (suntan). The contribution of the energy reflected by the skin to the total energy W absorbed by the layer 3 will vary with the nature of the skin. By carefully selecting the reference dye material in the layer 6, the contribution of the energy reflected by the skin 5 can be optimised in such a way that the density of colour generated in the layer 3 of photochromic material is representative of the dose of uv radiation tolerated by the skin without causing erythema. The maximum dose of uv radiation tolerated is known for various types of skin. The concentration of photochromic material is adjusted in such a way that the dose limit will bring the photochromic layer to an equal density with the reference layer. Accordingly, it will be appreciated that different devices according to the invention will be provided for different skin types. The maximum density of colour generation in the layer 3 can be determined by visual comparison with the density of the colour of the dye reference layers 6.

The sensitivity of the device is dependent upon the reflected uv energy from the skin 5 and its ability to increase the colour density in the photochromic layer 3. However, in use, some increase in density of colouration of the photochromic layer 3 will be created by the incoming light passing through the layer 3 before reflection on the skin 5. The optimum sensitivity of the layer 3 can be reached by adjusting the concentration of photochromic material in the layer 3 in such a way that the colour density produced by the reflected light is optimum. The density reaches a saturation point which varies with the type of photochromic material used. Maximum sensitivity corresponds to the level of concentration producing saturation.

Referring now to FIGS. 3 and 4 of the drawings, there is illustrated an alternative device according to the invention for qualitatively measuring uv radiation received by the skin. The device comprises a laminar arrangement 10 consisting of a transparent mesh structure 11 made of a material absorbent to uv radiation and which therefore acts as a uv filter. A layer 12 of a photochromic material is coated on one side 13 of the solid parts 14 of the mesh 11, such that in use the coated side 13 is nearest the skin 15 and the uncoated side 16 is exposed to sunlight.

The coated mesh structure 11 is applied to a transparent support 17 of cellulose triacetate. The support 17 is provided at each end with an adhesive strip 18 for ready application to the skin 15. The device is provided with a pair of reference layers 19 consisting of a dye dispersed in an organic binder and disposed longitudinally on either side of the mesh structure 11.

In the device depicted in FIGS. 3 and 4 of the drawings sensitivity to uv radiation is maximal due to the fact that only reflected light is responsible for colour development in the photochromic layer. Because of the presence of the mesh structure 11 which acts as a uv filter, the photo-chromic material is not directly exposed to sunlight. The uv radiation penetrates through open areas 20 of the mesh structure 11, is reflected on the skin 15 and absorbed by the photochromic layer 12. Colour generation in the layer 12 can be observed through the solid parts 14 of the transparent mesh structure 11. Colour development in the photochromic layer 12 can be compared with the reference dye layer 19 disposed on each side of the mesh structure 11. In this device colour development in the photochromic layer 12 is due solely to radiation reflected from the surface of the skin 15.

The invention will be further illustrated by the following Examples which describe the preparation of suitable photochromic materials and dye materials for use in the device according to the invention.

EXAMPLE 1

A. Preparation of a photochromic layer.

1,3-dimethyl-3-isopropyl-6-nitrospiro (2'H-1'-benzopyran-2,2'-indoline) (1 g) was dissolved in a small quantity of methylchloride. Polystyrene (400 mg) was dissolved in methylchloride and then the two solutions were mixed and the mixture applied to a cellulose triacetate film for use as a transparent support in a device as described above. The ratio of spiropyran:polystyrene:-methylchloride was 1:0.4:5 parts by weight.

B. Preparation of a dye layer (Reference).

Indigo (10 mg) was dissolved in a small amount of methylchloride. Polystyrene (400 mg) was dissolved in methylchloride and the resulting solution mixed with the solution of dye. The ratio of indigo:polystyrene:methylchloride used to obtain the desired consistency was 0.01:0.4:5 parts by weight. The emulsion thus obtained was coated on a transparent support of cellulose triacetate forming part of a device according to the invention. The amount of solvent used relates only to the thickness of the layer formed. The important factor is the ratio of dye to binder.

EXAMPLE 2

A. Preparation of a photochromic layer 5-bromo-3',3'-diethyl-8-methoxy-1'-methyl-6-nitrospiro (2'H-1'-benzopyran-2,2'-indoline) (1 g) was dissolved in a small quantity of toluene. Pliolite S-7 (Pliolite S-7 is a Trade Mark for a co-polymer of butadiene and styrene manufactured by Goodyear Chemicals) (5 g) was dissolved in toluene and the two solutions were then mixed and coated on a film of cellulose triacetate forming part of a device according to the invention. The ratio of spiropyran:Pliolite S-7:toluene used to obtain the desired consistency was 1:5:15 parts by weight.

B. Preparation of a dye layer (Reference)

Erythrosin B (50 mg) was dissolved in a small quantity of ethanol. Pliolite S-7 (5 g) was dissolved in toluene and the resulting solution mixed with the solution of erythrosin B and coated on a film of cellulose triacetate so as to form a reference layer in a device according to the invention. The ratio of erythrosin B:Pliolite S-7:toluene use to obtain the desired consistency was 0.05:5:15 parts by weight.

EXAMPLE 3

A. Preparation of a photochromic layer

1'-isopentyl-3',3-dimethyl-6-nitro-spiro (2H-1'-benzopyran-2'-indoline) (1 g) was dissolved in a small quantity of benzene. A solution of Cariflex TR 1101 (Cariflex TR 1101 is a Trade Mark for a co-polymer of butadiene and styrene) (5 g) was dissolved in benzene and the resulting solution mixed with the solution of spiropyran and coated on a film of cellulose triacetate forming a transparent support layer of a device according to the invention. The ratio of spiropyran:copolymer:benzene used was 1:5:15 parts by weight so as to obtain the desired consistency.

B. Preparation of a dye layer (Reference)

Gallein (100 mg) was dissolved in benzene. Cariflex TR 1101 (5 g) was dissolved in benzene and the resulting solution mixed with the solution of Gallein and applied as a reference dye layer to a film of cellulose triacetate forming a transparent support in a device according to the invention. The ratio of Gallein:copolymer:benzene used to obtain the desired consistency was 0.1:5:15 parts by weight.

What I claim is:

1. A device for the qualitative measurement of uv radiation received by the skin, said device comprising a laminar strip for application to the skin, the strip including:

(a) a photochromic material disposed intermediate the ends of the strip; and (b) a reference material disposed intermediate the ends of the strip; said reference material being so arranged relative to the photochromic material so as to permit a visual assessment of exposure to uv radiation, based, at least partially, on uv radiation reflected from the skin, by a direct comparison of the colour densities of the photochromic material and the reference material during exposure to sunlight.

2. A device according to claim 1, wherein the reference material is a dye which closely matches the colour of the photochromic material after exposure to a pre-determined quantity of uv radiation, said pre-determined quantity of uv radiation corresponding to the maximum exposure tolerable by the particular skin type.

3. A device according to claim 2, wherein the dye is selected from the group consisting of azo, anthraquinone, indigo, oxazine, methine, xanthene and triarylmethane dyes.

4. A device according to claim 1, wherein the photochromic material and the reference material are each finely dispersed in an organic binder.

5. A device according to claim 4, wherein the photochromic material and the reference material each represent a solid emulsion or a solid solution in the organic binder.

6. A device according to claim 4, wherein the organic binder is hydrophobic and non-degradable upon exposure to uv radiation.

7. A device according to claim 4, wherein the organic binder is selected from the group consisting of a butadiene polymer, a styrene polymer and a butadienestyrene copolymer.

8. A device according to claim 1, wherein said reference material comprises a layer of reference material positioned on either side of the photochromic material.

9. A device according to claim 1, wherein the photochromic material is coated on a layer of transparent material.

10. A device according to claim 9, wherein the transparent material is selected from the group consisting of cellulose triacetate, a cellulose polyester and polyethylene terephthalate.

11. A device according to claim 10, wherein the layer of transparent material has a thickness of between 60 and 200 microns.

12. A device according to claim 1, further comprising adhesive means coupled to said strip for adhesion to the skin.

13. A device according to claim 9, wherein the laminar strip comprises a thin transparent substrate which is an integral part of an adhesive tape for adhesion to the skin, the photochromic material dispersed in an organic binder is applied as a band extending longitudinally of and intermediate the longitudinal edges of the strip and each of the longitudinal edges of the strip is coated with a layer of a dye dispersed in an organic binder.

14. A device according to claim 13, wherein the density of colouration of the dye layer is adjusted so that it corresponds to the density of colouration of the photochromic layer after exposure to a dose of uv radiation corresponding to the dose tolerated by the skin.

15. A device according to claim 1, wherein the photochromic material is coated on the solid parts of a transparent mesh, the mesh being composed of a material which is uv absorbent, and the mesh being coated on its surface which in use is nearest the skin with said photochromic material, such that uv radiation impinging on the photochromic material is totally reflected from the skin.

16. A device according to claim 1, wherein the photochromic material is a spiropyran.

17. A device according to claim 16, wherein the spiropyran is a compound of the general formula I:

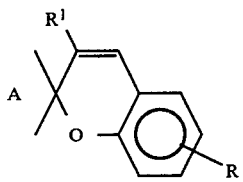

in which A represents: a group of the formula,

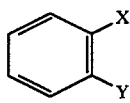

wherein X is selected from the group consisting of:

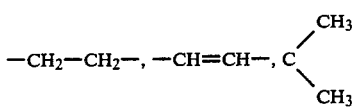

O, S, Se and NH and Y is selected from the group consisting of: O, S and N(R) where R is as hereinafter defined, the ring containing X and Y optionally containing a further double bond; or a group of the formula

wherein X is S and Y is selected from the group consisting of: O and S, R represents one or more groups selected from the group consisting of: hydrogen, $C_{1-8}$-alkyl, halogeno $C_{1-6}$ alkyl, $C_{1-6}$alkoxy, halogen, nitro, hydroxy, aryloxy, unsubstituted phenyl or phenyl substituted by one or more R groups, a piperidyl radical, an alkylene ester group, an alkylene carboxyl group and a substituted or unsubstituted carbonamide group and $R^1$ represents hydrogen or an aliphatic or aromatic hydrocarbon group.

18. A device according to claim 17, wherein the spiropyran is a compound of the formula II:

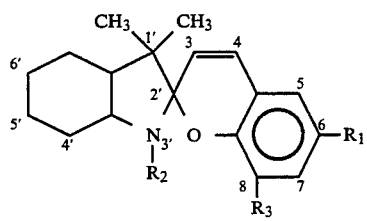

wherein $R_1$, $R_2$ and $R_3$ are identical or different and each has the values specified for R in claim 17.

19. A device according to claim 18, wherein in the compound of formula II $R_1$ is nitro, $R_2$ is isopropyl and $R_3$ is methoxy.

20. A device according to claim 17 or 18, wherein the spiropyran is selected from the group consisting of:
1,3 dimethyl-3-isopropyl-6-nitrospiro (2'H-1'-benzopyran-2,2'-indoline);
5-bromo-3',3'-diethyl-8-methoxy-1'-methyl-6-nitrospiro (2'H-1'-benzopyran-2,2'-indoline);
1'-isopentyl-3',3-dimethyl-6-nitrospiro (2'H-1'-benzopyran-2'-indoline);
7-nitro-5,6,8-trichloro-1',3',3'-trimethylspiro (2H-1-benzopyran-2,2'-indoline);
1-3',3',8-tetramethylspiro (2H-1-benzopyran-2,2'-indoline);
4',6',8-trimethoxy-1',3',3'-trimethylspiro (2H-1-benzopyran-2,2'-indoline);
4',7',8-trimethoxy-1',3',3'-trimethylspiro (2H-1-benzopyran-2,2'-indoline);
5',7',8-trimethoxy-1',3',3'-trimethylspiro (2H-1-benzopyran-2,2'-indoline);
3,3'-dimethyl-6,6'-dinitrospiro (2H-1-benzopyran-2,2' benzothiazoline);
3,3'-dimethyl-8-methoxy-6-nitro-5' phenylspiro (2H-1-benzopyran-2,2'-benzoxazoline);
6-chloro-6'-nitro-3-phenyl-2,2'-spirobi (2H-1-benzopyran);
8-methoxy-8'-nitro-3-phenylspirobi (2H-1-benzopyran);
6,8 diiodo-1',3',3'-trimethylspiro (2H-1-benzopyran-2,2'-indoline);
6-hydroxy-8-methoxy-1',3',3'-trimethylspiro (2H-1-benzopyran-2,2'-indoline);
6',8-dimethoxy-3,3'-dimethyl-6-nitrospiro (2H-1-benzopyran-2,2'-benzothiazoline);
3,3'-dimethyl-6,6'-dinitrospiro (2H-1-benzopyran-2,2' benzothiazoline);
3,3'-dimethyl-8-methoxy-6-nitrospiro (2H-1-benzopyran-2'2 benzothiazoline);
3-ethyl-8-methoxy-3'-methyl-6-nitrospiro (2H-1-benzopyran-2'2 benzothiazoline);
3'-ethyl-8-methoxy-3-methyl-6-nitrospiro (2H-1-benzopyran-2,2'-benzothiazoline);
5-bromo-8,8'-dimethoxy-6-nitro-3' phenylspirobi (2H-1-benzopyran);
6-hydroxy-1',3',3'-trimethylspiro (2H-1-benzopyran-2,2'-indoline);
6-phenylazo-1',3',3'-trimethylspiro (2H-1-benzopyran-2,2'-indoline);
6'-acetamido-3,3'-dimethyl-6-nitrospiro (2H-1-benzopyran-2,2'-benzothiazoline);
6'-amino-3,3'-dimethyl-6-nitrospiro (2H-1-benzopyran-2,2' benzothiazoline);
8-bromo-3,3'-dimethyl-6-nitrospiro (2H-1-benzopyran-2,2'-benzothiazoline);
6-chloro-3,3'-dimethyl-8-nitrospiro (2H-1-benzopyran-2,2'-benzothiazoline); and
8-methoxy-3'-methyl-6-nitro-3-propylspiro (2H-1-benzo-pyran-2,2'-benzothiazoline).

21. A method of qualitatively measuring uv radiation received by the skin, which comprises applying a device as claimed in claim 1 to an area of the skin exposed to sunlight and assessing the dose of radiation received at selected intervals of time by a direct visual comparison of the colour densities of the photochromic material and reference material, respectively.

* * * * *